United States Patent [19]

Bednar et al.

[11] Patent Number: 4,562,594
[45] Date of Patent: Dec. 31, 1985

[54] METHOD AND APPARATUS FOR SEGMENTING CHARACTER IMAGES

[75] Inventors: Gregory M. Bednar, Matthews; George B. Fryer, Charlotte, both of N.C.

[73] Assignee: International Business Machines Corp. (IBM), Armonk, N.Y.

[21] Appl. No.: 537,280

[22] Filed: Sep. 29, 1983

[51] Int. Cl.$^4$ ............................................. G06K 9/34
[52] U.S. Cl. .......................................... 382/9; 382/48
[58] Field of Search ..................................... 382/9, 48

[56] References Cited

U.S. PATENT DOCUMENTS

| | | | |
|---|---|---|---|
| 3,164,806 | 1/1965 | Rabinow | 382/9 |
| 3,526,876 | 9/1970 | Baumgartner et al. | 382/9 |
| 3,992,697 | 11/1976 | Knab et al. | 382/48 |
| 4,013,999 | 3/1977 | Erwin et al. | 382/48 |
| 4,045,773 | 8/1977 | Kadota et al. | 382/9 |
| 4,377,803 | 3/1983 | Lotspiech et al. | 382/9 |
| 4,466,121 | 8/1984 | Damen et al. | 382/9 |

OTHER PUBLICATIONS

Jih, "Segmentation Method for Fixed-Pitch and Machine-Printed Documents", *IBM Tech. Disclosure Bulletin*, vol. 23, No. 3, Aug. 1980, p. 1194.

Baumgartner, "Character Pitch Determination", *IBM Tech. Disclosure Bulletin*, vol. 14, No. 10, Mar. 1972, pp. 3104–3107.

*Primary Examiner*—Leo H. Boudreau
*Assistant Examiner*—Joseph Mancuso
*Attorney, Agent, or Firm*—Bell, Seltzer, Park & Gibson

[57] ABSTRACT

A method and apparatus are disclosed for segmenting character images in an optical image system where the character images have a predetermined pitch. The optical image system generates character information in the form of a successive series of scan lines of data. Profiles of the character images being scanned are generated, and a profile segment meeting certain criteria is selected. The center of the selected profile segment is located, and segmentation points between the character images are established as a linear function of the character image pitch and located center. The segmentation points are integer multiples of the pitch.

15 Claims, 4 Drawing Figures

ESTIMATED LINE FOR BOX CENTERS $C = an + b$
ESTIMATED SEGMENTATION POINTS: $X = an + (b - a/2)$
where $a$ = KNOWN PITCH
$b$ = ESTIMATED CENTER OF FIRST BOX
$n$ = CHARACTER NUMBER (0, 1, 2, 3, ...)

METHOD AND APPARATUS FOR SEGMENTING CHARACTER IMAGES

FIELD OF THE INVENTION

This invention relates to the field of optical character recognition, and to the segmentation of the character images in a line of characters.

BACKGROUND OF THE INVENTION

An important function of optical character recognition (OCR) apparatus is that of segmenting a line of characters into individual character images, so that individual characters may be recognized or identified.

Generally, individual characters are successively written along a horizontal line. Successive horizontal lines are written as necessary. Assuming that the characters are read horizontally, the vertical orientation parameter of the OCR process is generally used to find lines on a document, whereas horizontal orientation is generally referred to as segmentation. Segmentation is the process of dividing a horizontal string of characters into separate or discrete characters, i.e. dividing a word into its individual letters. The segmentation process allows the visual image of a scanned character to be binarized and stored as a binary video data pattern which ideally contains only the data associated with the character to be recognized. The data is typically coded as picture elements (PELS) that are either black or white, which respectively represent the presence of a character portion or the presence of background (i.e. the absence of a character portion) at a particular location.

Once the character is recognized, a coded representation (usually a hexadecimal byte) of that character is transmitted to data processing equipment.

In the past, methods for segmenting character images were expensive, complex, slow, and hardware intensive because they were designed to accommodate the most difficult case. As a result, they were not compatible with modern day microprocessors. For instance, an early segmentation technique is shown in U.S. Pat. No. 3,526,876. In this patent, character pitch is determined from pairs of adjacent characters, and the pitch data is used to partition each character space into areas. Each successive area is scanned vertically, and logical tests are made in each area to determine when the character has been completely scanned. Character height and width are logically analyzed to segment the characters. Pitch is used to segment the characters only if no other segmentation point is located.

U.S. Pat. No. 4,045,773 discloses another early segmentation technique that adjusts the segmentation point depending upon whether or not the scanned character is within a character frame. The rows of horizontally extending characters are scanned vertically after the interval of the lines separating the character frames has been provided. The scanned pattern portion is projected and tested for the presence of a logical 1, which represents a dark spot, to determine whether or not the scanned pattern portion is a blank. The start and end points of a character are determined, and the center of the character is calculated using the start and end points. If the character is too small, scanning continues beyond the first start and end points to determine if the character comprises two or more subpatterns, or if it should be rejected as noise. Having calculated the center of the subpattern or character, the location of the center is compared to the location of the character frame. All characters or patterns or subpatterns having a center within the character frame are segmented as a single character pattern.

SUMMARY OF THE INVENTION

While prior art segmentation techniques are satisfactory from a functional standpoint, they are too complex for low-cost implementation in that they generally require special purpose hardware.

The present invention, on the other hand, is well suited to implementation using a general purpose microprocessor because the calculations can be accomplished with logical and arithmetic functions. The present invention uses a horizontal profile of the character string, followed by a linear regression technique, to determine the best estimate of the segmentation points within the character string. Overlapped characters, connected characters, underscored characters, broken characters and blank character spaces are all successfully segmented. In addition, validation steps, such as a segmentation recognition retry feature which utilizes feedback from the recognition of the specific characters, may be used to enhance segmentation accuracy.

The horizontal line of characters is scanned to generate successive lines of data representing the characters, including blank spaces, overlapped characters, etc. Each scan line is comprised of binary picture elements (PELS) represented by binary data. The data from the successive scans of the character spaces or fields is logically ORed resulting in a horizontal binary character line profile in which a continuous series of bits of one binary state (i.e., binary bit "1") represents a continuous series of black picture elements (PELS), and a series of the other binary state (i.e. binary bit "0") represents a series of white PELS. The series of black bits corresponds to horizontal character width, while the series of white bits corresponds to gaps between characters, or to the separation between portions of a broken or multipart character. A character space profile consists of the series of black and white PELS that corresponds to one character position within the horizontal character line profile. A profile segment is a continuous series of black PELS that corresponds to one or more characters or a discrete part of a multipart character within the character line profile.

The center of one or more series of continuous black bits is located within this horizontal line profile, and a linear regression is performed.

The linear regression is performed with respect to a plot of relative character position number (i.e., character number 1, character number 2, etc.), versus the horizontal segmentation axis, which is measured in PELS in the X-direction. For instance, character number 2 may have its center at x PELS, and character number 3 may have its center at y PELS, where y is greater than x.

The linear function algorithm, which may be implemented in software for use by a general purpose microprocessor, makes use of the condition that the center of a character space can be estimated from the center of a suitable profile segment. If the character pitch is known, only the intercept of the linear function with the segmentation axis need be calculated, since the pitch is equal to the slope of the function. If all characters are centered or substantially centered in their respective character space, the center of only one suitable profile segment will yield the segmentation points for the entire line of characters, because the segmentation points for the other characters are integer multiples of the pitch.

If the character pitch is not known, it may be determined using the centers of the profile segments and performing a regression to define the line that best fits the observed data, according to some principle, such as the principle of least squares, with a least-squares linear regression algorithm. This well known statistical algorithm fits a straight line to a set of observed points (i.e. the center of the profile segments plotted on a graph of relative character position versus PELS along the horizontal segmentation axis) in such a way that the sum of the squares of the distances of the observed points to the line is at a minimum. This least-squares fit of the best straight line to the observed points permits one to determine the slope of the line and, thus, the character pitch. The intercept of this line with the coordinate system yields the segmentation points along the horizontal axis in the manner described in the previous paragraph.

Restated, the invention relates to a method of segmenting character images in an optical image system where the character images have a predetermined pitch. The optical image system generates character information in the form of a series of scan lines of data. Profiles of the character images being scanned are generated, and a profile segment meeting certain criteria is selected. The center of the selected profile segment is located, and segmentation points between the character images are established as a linear function of the character image pitch and located center. The segmentation points are integer multiples of the pitch.

DESCRIPTION OF AN ILLUSTRATIVE EMBODIMENT

Figure 1:
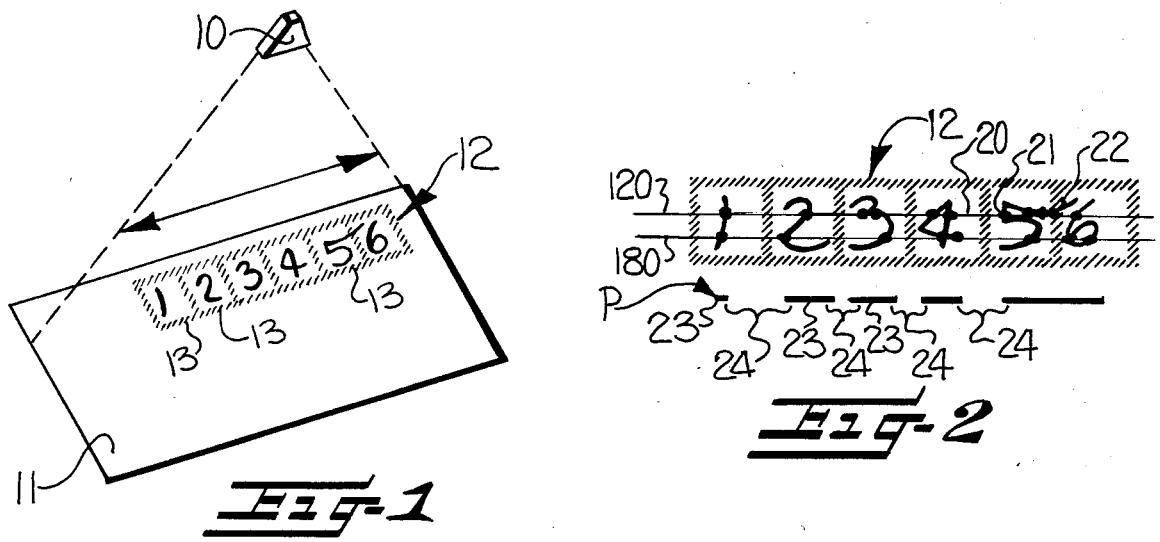
FIG. 1 is a schematic drawing showing an optical character recognition system.

Referring to FIG. 1, an optical scanner 10 of known construction and operation scans a document 11 having one or more horizontal lines of characters 12. The characters are scanned in a direction generally parallel to the direction in which they are written (i.e., horizontally). The scanner typically examines the entire length of the document by moving either document or the scanner mechanism, and the entire width of the document by selecting a field of view of appropriate width. The document may be provided with a series of contiguous horizontal boxes 13 that define a preferred character image location to assist in the proper spacing of handwritten characters. The boxes have a predetermined pitch and delineate areas into which character images will preferably be located, in a one-to-one correspondence.

Figure 2:
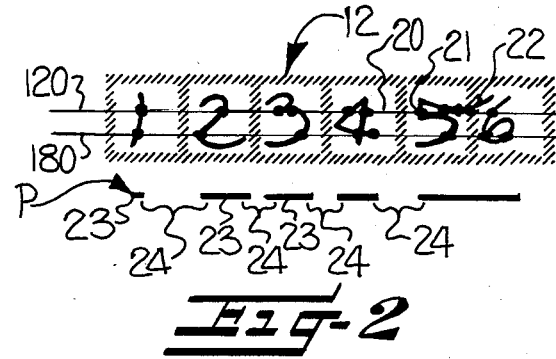
FIG. 2 is a schematic drawing representing two exemplary scan lines of data from scanning the character images of FIG. 1, and the horizontal line profile for the line of illustrated characters.

Referring also to FIG. 2, the optical scanner generates information representative of the character images on the document, and this information is a series of scan lines of binary data representing the dark and light portions of the document and, thus, the characters thereon. The information is a series of binarized electrical signals, each signal or bit corresponding to one picture element or PEL, the units which comprise the scan line. Each scan line may contain several hundred PEL's, or more.

More specifically, and by way of example, at scan line address location 120, the scanner generates a scan line of binary data where a logical 0 (zero) represents a blank or background space 20, and a logical 1, shown as a thick dot 21 on the scan line, represents the presence of a character image along the scan line. The boxes 12 are invisible to the scanner and thus are represented by a logical 0 unless a character image should also be present, as where the trail of the numeral 5 crosses into a box at reference numeral 22. The scanner makes successive horizontal scans along the length of the document, and each scan line may present correspondingly different data. This is illustrated by a comparison of the scan line at horizontal address location 120, with the scan line at horizontal address 180.

The horizontal scan lines of data are logically combined with an OR function to generate a horizontal character line profile for the line of scanned characters. The horizontal line profile is representative of the width of the characters in the line and the spacing between the characters.

In operation, the optical scanner generates information representative of the character images on a document, and this information is usually a series of scan lines of binary data representing the dark and light portions of the document and, thus, the characters thereon. The scanner makes successive horizontal scans and for each scan it generates logical zeros (0's) to represent a blank or background space, and logical ones (1's) to represent the presence of character image along the scan line. One method of generating the horizontal profile is to sequentially provide a predetermined number of the horizontal scan lines for a certain row of characters to a register having storage positions that correspond to the picture element (PEL) locations of a scanned document. Beginning with a clear register (i.e. all logical zeros), the horizontal scan lines of data are effectively logically combined with an OR function by successively providing them to the register. For each logical 1 in the scan lines of data, the corresponding register bit is set to a logical 1, and remains a logical 1 until the register is cleared after the entire line of character images has been scanned. For those PEL locations where there is only background space, the register will remain a logical zero. Having provided all of the scan lines of data to the register, it will reflect which horizontal positions have character data present, and this data is reflected in the horizontal line profile.

The resulting horizontal line profile, such as the one illustrated at reference letter P for FIG. 2, appears as a series of black segments (logical 1's) separated by gaps of white (logical 0's). The black segments 23 correspond to the widths and horizontal locations of the scanned character images, and the white gaps 24 correspond to the separations between adjacent scanned character images. Although the profile has been described as horizontal, it is to be understood that the profile is parallel to the direction of reading, and thus may be oriented vertically for an alphabet that is read vertically.

Figure 3:
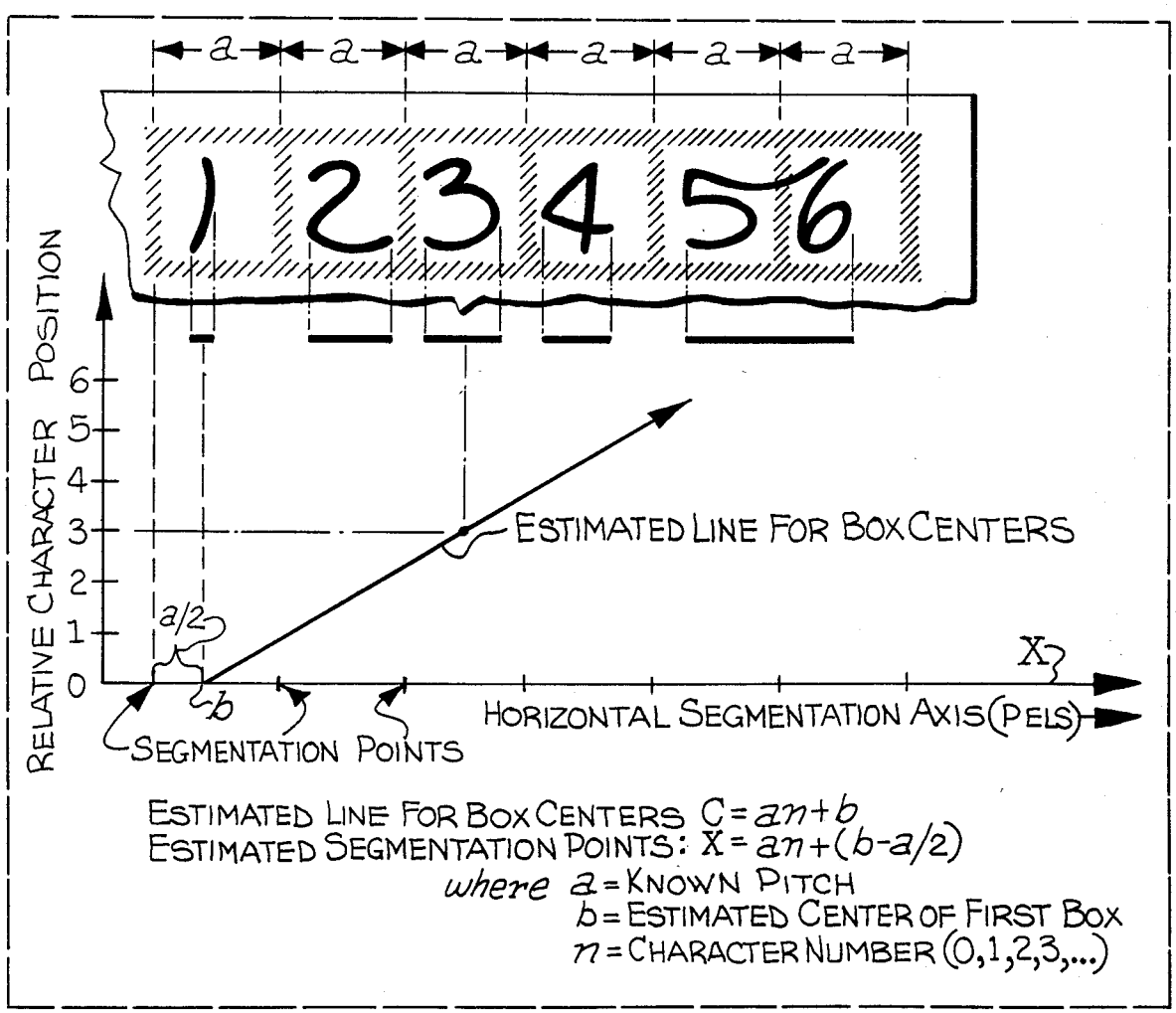
FIG. 3 illustrates a set of character patterns of predetermined pitch and their profile segments superimposed on a graph of relative character position versus PELS along the horizontal segmentation axis, and the line represented by the equation $X = an + (b - a/2)$.

For each horizontal line of character images, the corresponding horizontal line profile is tested for one profile segment 23 that meets predetermined maximum and minimum width criteria. Profile segments that are too narrow, such as profile of a 1, are rejected because the location of the character image within the preferred character position (i.e. box 13) may vary substantially, or the profile may represent noise. Profile segments that are too wide, such as the profile segment of a carelessly drawn 5 where the top line extends too far to the right, are rejected because the character image may extend outside the confines of the preferred character position. Profile segments falling within the predetermined range, such as the number 3 in FIGS. 1-3, are more likely to have a character image centrally located within the preferred character position. Specifically, if there are 200 PELS per inch and the character spacing is 10 characters per inch, the preferred width range for the horizontal profile segment is 12 to 20 PELS. This width range changes with changes in character spacing. For example, if the character spacing is 12 characters per inch, the preferred width range is 10 to 17 PELS. Experimental testing has shown that a valid profile segment usually is found within the first few character positions in a line, and often is the first character position of the line.

Having selected a qualifying horizontal profile segment, its center is located. This will likely correspond closely to the center of the character and the center of the preferred character location, and is referred to as the estimated center. The true center of the preferred location is designated the actual center.

Referring to FIG. 3, the method makes use of the condition that the center of a preferred character location can be estimated from the center of the character itself, which is obtained from the corresponding profile segment. Knowing the location of the character image center or the center of the character's profile segment, and the character pitch, and applying a linear regression technique, one may determine the segmentation points within the line of characters. The character pitch is equal to the slope of the linear function, and the center of the selected profile segment identifies a point on the line corresponding to the function that defines the segmentation points. Thus, the equation for the estimated line for the centers of the preferred character locations becomes:

$$C = an + b$$

where
a = known pitch,
b = estimated center along the x-axis of the first preferred character location or box location, and
n = character number (0,1,2, ... ) Similarly, the equation for the estimated segmentation points becomes:

$$X = an + (b - a/2).$$

The distance along the x-axis a/2 represents the distance from the left margin of the first box to its center. The resulting segmentation points are integer multiples of the known pitch, and permit accurate segmentation.

Figure 4:
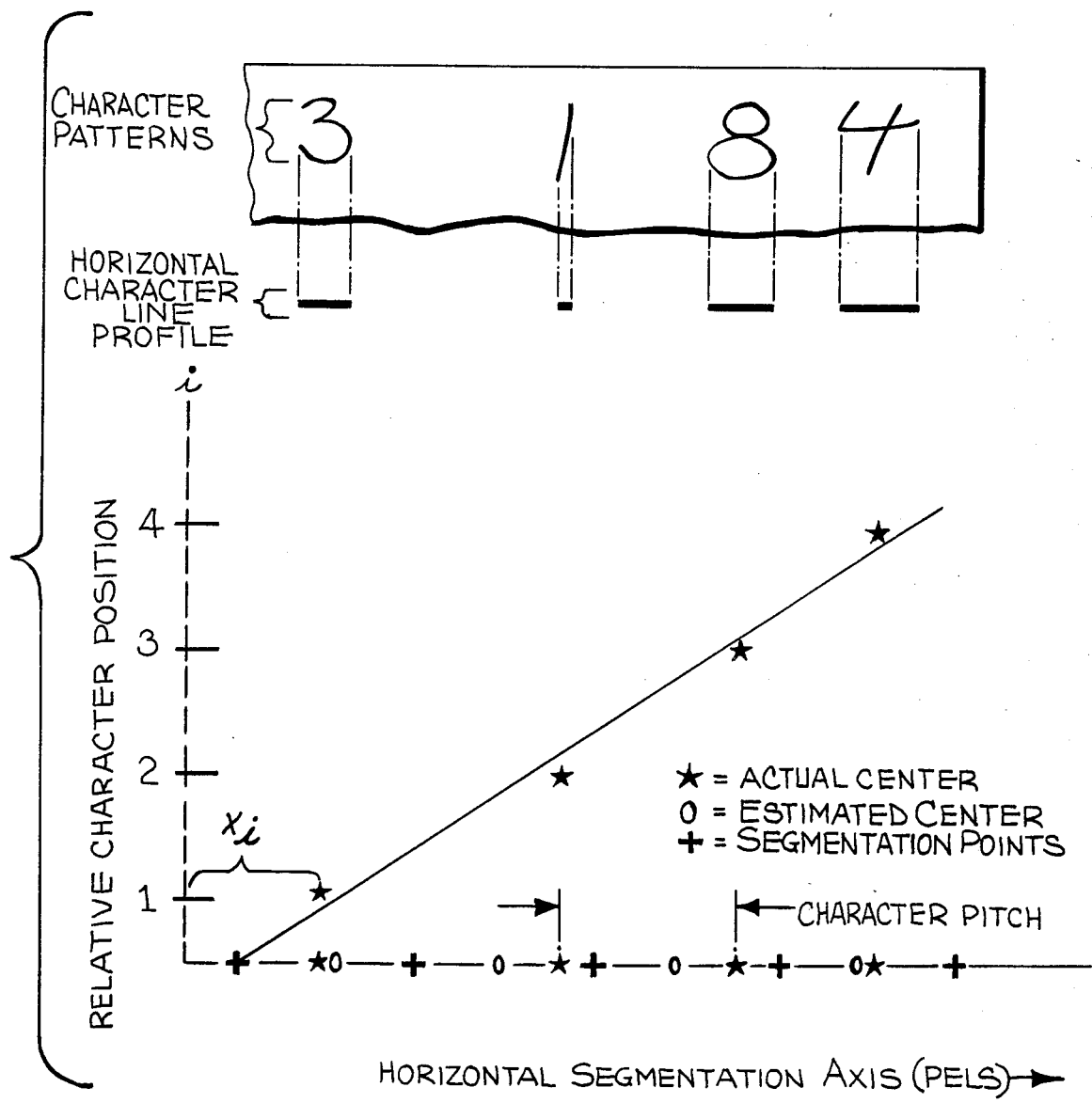
FIG. 4 is similar to FIG. 3, and it illustrates the use of the present invention with a least squares linear regression used to determine the character pitch.

Referring to FIG. 4, if the character pitch is not known, the relative character position and center of the respective profile segments are used with a least squares regression to determine the pitch. The expression for the regression is:

$$\sum_{i=1}^{n} [x_i - (d + ey_i)]^2$$

where
d = x-axis intercept,
e = 1/slope and
$x_i$ = distance from the origin to the actual center of a profile segment i.

Minimizing this expression will define a line $x = d + ey$, and its pitch may be determined. Knowing the pitch of the line, the solution to the least squares criteria reduces to minimizing the sum of the squares with respect to only one variable, the intercept with the horizontal segmentation axis. Having this information, the method described in connection with FIG. 3 may be used. Another method of determining character pitch is disclosed in IBM Technical Disclosure Bulletin, Vol. 14, No. 10, March 1972.

The segmentation points determined may be verified or adjusted by other techniques or empirically developed rules. For instance, the coincidence of a space between characters and a determined segmentation point suggests that the determined segmentation point is a natural segmentation point. If the determined segmentation point does not coincide with a natural segmentation point, the determined segmentation point may be adjusted in either direction a predetermined distance to see if a natural segmentation point is within the adjusted distance. This facilitates the recognition of characters that are overlapped, connected or broken. If the adjusted segmentation point results in a recognition failure, the original segmentation points may be used for a recognition retry.

This segmentation method also provides solutions for unusual but not uncommon recognition requirements, such as the detection of character blanks, the segmentation of underscored characters, and the deletion of noise. Character blanks will have a profile segment of all logical 0's, and are recognized directly from the horizontal line profile, bypassing further processing. Overlapped characters may be segmented by generating a profile segment based only on a certain portion of the character image, i.e. the lower, central, or upper portion. Ideally, the omitted portion of the character image will be that portion including the overlap. For example, underscored characters can be segmented by generating a profile segment based only on the upper portion of the character image which does not include the underscore. Noise can be deleted by establishing minimum requirements for the profile segment and adjusting segmentation points accordingly.

In the drawings and specification there has been set forth an exemplary embodiment of the invention. It should be understood that while specific terms are used, they are employed in a generic and descriptive sense only and not for purposes of limitation.

That which is claimed is:

1. A method of segmenting character images in an optical system where the character images have a predetermined pitch and the optical image system generates character information comprising a series of scan lines of data, the method comprising:
   generating from the scan lines of data profile segments of the character images being scanned, each profile segment being parallel to the direction of reading and representing the size of a scanned character image in the direction of reading;

selecting a generated profile segment that meets certain predetermined size criteria;

locating the center of the selected profile segment; and establishing segmentation points between character imaged by generating a linear function dependent upon the predetermined character image pitch and the located center of the selected profile segment, whereby the segmentation points for the character images are integer multiples of the pitch.

2. The method of claim 1 wherein the step of generating profile segments of the character images being scanned comprises logically combining the lines of data with an OR function so that the logically combined data corresponds to character size and separation between characters in the direction of reading.

3. The method of claim 2 wherein the step of generating profile segments of the character images being scanned comprises eliminating profiles that do not meet certain minimum requirements so that noise is deleted.

4. The method of claim 1 wherein the step of selecting a generated profile segment comprises testing the profile segments of the character images for one that meets certain predetermined maximum and minimum size criteria.

5. The method of claim 4 wherein the step of generating horizontal profile segments of the character images being scanned comprises logically combining only the first portion of the character images so that the horizontal profile segment of the character images consists of the horizontal profile of only the first portion of the character and does not include any other portion.

6. The method of claim 1 wherein the step of generating profile segments comprises generating horizontal profiles of horizontally read characters.

7. The method of claim 1 further including the step of verifying the established segmentation points as valid segmentation points between characters.

8. The method of claim 1 wherein the step of establishing segmentation points between character images comprises establishing the segmentation points at a location X defined by $X = an + (b - a/2)$ where a = predetermined pitch, b = the location of the center of the selected profile, and n = an integer corresponding to the character number.

9. The method of claim 1 wherein the step of generating a linear function comprises generating a function defined on a graph having an x-axis and a y-axis by a straight line having an expression:

$$c = an + b$$

where a = known pitch b = estimated center along the x-axis of the first preferred character location or box location, and n = character number (0, 1, 2 ...).

10. The method of claim 1 wherein the step of generating a linear function comprises generating a function defined on a graph having an x-axis and a y-axis by a straight line defined by minimizing the expression $$\sum_{i=1}^{n} [x_i - (d + ey_i)]^2$$

where d = x-axis intercept e = 1/slope, and $x_i$ = distance from the origin to the actual center of a profile segment i.

11. The method of claim 1 wherein the step of selecting a generated profile segment comprises selecting the first generated profile segment that meets certain predetermined size criteria.

12. A method of segmenting character images in an optical image system where the character images have a predetermined pitch and the optical image system generates character information comprising a series of successive horizontal scan lines of data, each line comprised of a series of binary bits representing the presence or absence of a portion of a character image, the method comprising:

logically combining the binary bits of selected successive scan lines with a logical OR function to generate horizontal profile segments of the character images being scanned, each profile segment representing the width of a scanned character image;

selecting a generated horizontal profile segment that meets certain predetermined width criteria;

locating the center of the selected horizontal profile segment; and establishing segmentation points between character images as a linear function of the character image pitch and located center, whereby the segmentation points for the character images are integer multiples of the pitch.

13. The method of claim 12 wherein the step of selecting a generated horizontal profile segment comprises testing the horizontal segment of the character images for one that meets certain predetermined maximum and minimum width criteria.

14. The method of claim 12 wherein the step of locating the center of the selected horizontal profile segment also includes the step of storing the scan line address of the binary bit corresponding to the center of the selected horizontal profile segment.

15. A method of segmenting character images in an optical image system including a microprocessor where the character images have a predetermined pitch and the optical image system generates character information comprising a series of successive horizontal scan lines of data, each line comprised of a series of binary bits representing the presence or absence of a portion of a character image, the method comprising:

logically combining the binary bits of selected successive scan lines with a logical OR function to generate horizontal profile segments of the character images being scanned, each profile segment representing the width of a scanned character image, and the gaps between adjacent profile segments representing the separations between characters, and storing the profile segments in the memory of the microprocessor;

selecting a generated profile segment from among those profile segments stored in the microprocessor that meets predetermined width criteria;

locating the center of the selected horizontal profile segment and storing the address of the binary bit corresponding to the center of the selected horizontal profile segment; and establishing segmentation points between character images as a linear function of the character image pitch and located center, whereby the segmentation points for the images are integer multiples of the pitch.

* * * * *

UNITED STATES PATENT AND TRADEMARK OFFICE
CERTIFICATE OF CORRECTION

PATENT NO. : 4,562,594

DATED : December 31, 1985

INVENTOR(S) : Gregory M. Bednar, George B. Fryer

It is certified that error appears in the above-identified patent and that said Letters Patent is hereby corrected as shown below:

Col. 3, line 57: after "moving either" add -- the --
Col. 4, line 17: "where the trail" should read -- where the tail --
Col. 6, line 9 : after "slope" add -- , --
Col. 6, line 63: after "optical" add -- image --
Col. 7, line 9 : imaged should read -- images --
Col. 7, line 17: "to character size and separation " should read -- to character sizes and separations --

Signed and Sealed this

Sixth Day of May 1986

[SEAL]

Attest:

DONALD J. QUIGG

Attesting Officer

Commissioner of Patents and Trademarks